Oct. 18, 1960    M. P. WHITE ET AL    2,957,109
OVERCURRENT PROTECTION DEVICES
Filed June 10, 1958    2 Sheets-Sheet 1

WITNESSES
Leon J. Taza
James F. Young

INVENTORS
Ralph B. Immel and
Marshall P. White
BY
Paul E. Friedemann
ATTORNEY

United States Patent Office 2,957,109
Patented Oct. 18, 1960

2,957,109

OVERCURRENT PROTECTION DEVICES

Marshall P. White, Grand Haven, Mich., and Ralph B. Immel, Williamsville, N.Y., assignors to Westinghouse Electric Corporation, East Pittsburgh, Pa., a corporation of Pennsylvania Filed June 10, 1958, Ser. No. 741,078

8 Claims. (Cl. 317—41)

The purpose of this invention is to provide overcurrent protection for electric load units.

It is often necessary to employ various control protective devices to reduce the current in large current carrying conductors when the current in such conductors exceeds a certain critical value. These currents may be of the order of 10,000 amperes or more. Overcurrent protection for such conductors is at present, by prior art devices, obtained by means of suitable relays. These relays work in response to the magnetic flux produced by the current in the conducting bus. These relays are almost impossible to properly calibrate in the field. Although the calibration is possible at the time of manufacture, the relay usually loses its adjustment when applied, due to the change in flux distribution in the particular environment.

One broad object of this invention is to provide overcurrent protection by means that are highly reliable and are easily calibrated and adjusted for the environment of use.

It is a more specific object of this invention to provide overcurrent protection of a load circuit by apparatus that is conductively isolated from the load circuit.

It is a further more specific object of this invention to utilize a Hall generator for the pick-up signal for a transistor type overcurrent protection system.

The objects stated are merely illustrative. Other objects and advantages will become more apparent from a study of the following specification and the accompanying drawing, in which.

A Hall generator is essentially a device that provides a voltage output proportional to the product of two quantities—(a) the current being conducted through it, and (b) the magnetic field perpendicular to it. A more detailed description will be given with the detailed discussion of Fig. 2.

Figure 1:
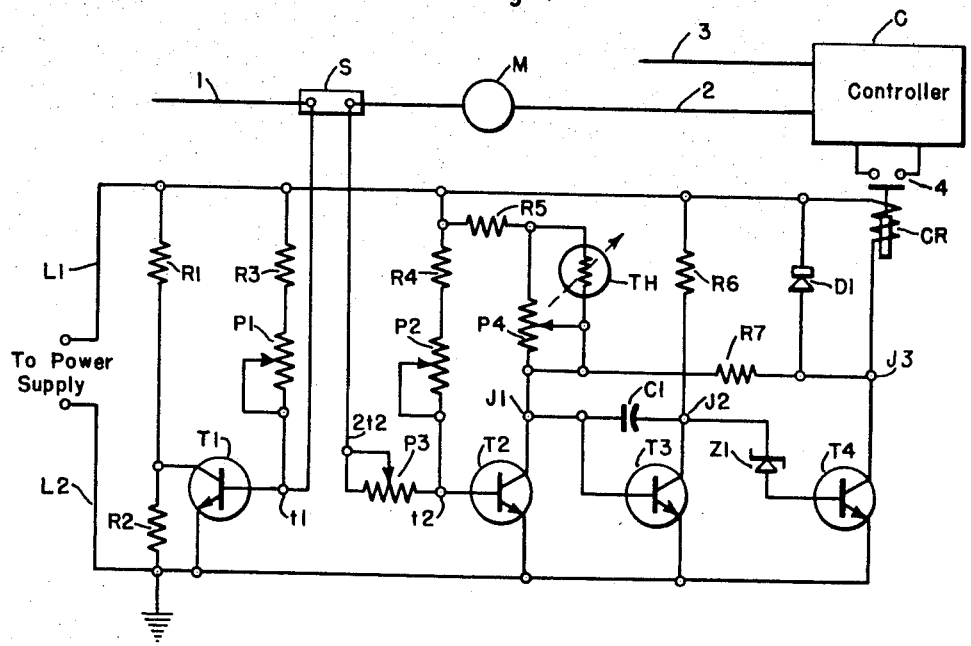
Figure 1 is a diagrammatic showing of transistor type circuitry for providing overcurrent protection with the input signal from a shunt.

Fig. 1 shows a system, which can be very easily calibrated for any location because of the use of the instrument shunt S. The load may be a large direct current motor M, where the motor circuit may be traced from the supply lead 1, through shunt S, motor M, lead 2, controller C, to the other supply lead 3.

For "fail-safe" operation, the control relay CR is normally energized so that its contacts 4 are normally closed. Upon occurrence of an overcurrent, the relay CR is deenergized and contacts 4 open. Upon opening of contacts 4 the controller effects the opening of the motor load circuit. This type of control operation also increases the speed of response because a relay can drop out several times faster than it can pick up.

Fig. 1 includes the showing of a suitable static direct current amplifier. This amplifier can be set to switch "off" and drop out the relay CR at a value of input as low as 20 millivolts and as high as desirable by adjusting the magnitude of the effective resistance of the potentiometer P3.

The amplifier shown is known in the prior art, but several improvements and refinements have been made to improve its performance for the application herein disclosed. The amplifier, disregarding the improvements and refinements for the moment, includes a single transistor preamplifier input stage including the transistor T2 followed by a Flip-Flop output stage including the transistors T3 and T4 and a Zener diode Z1. The transistors shown are of the N–P–N type and are operated in the common emitter configuration.

One of the refinements added to the amplifier circuitry is the transistor T1 and its circuitry for connection of this transistor to the supply leads L1 and L2. Transistor T1 provides a positive input terminal $t1$ which is at the same potential as the terminal $t2$, that is, the same potential as the base of transistor T2. This is so because transistors T1 and T2 are as near identical in operating characteristics as they can be selected, and the electrical and physical characteristics of potentiometers P1 and P2 are the same or matched to each other, and, the characteristics of resistors R3 and R4 are similarly matched to each other.

Due to the non-linear input characteristics of transistors, terminal $t2$ is about 700 millivolts above the voltage of the emitter of transistor T2 before conduction begins to take place at room, or ambient, temperature, and only a few millivolts above 700 millivolts for complete "saturation" in this application, or use.

By providing the terminal $t1$, which is at the same potential as terminal $t2$, only a very small decrease in voltage on terminal $t2$ is needed to drive transistor T2 into "cut off." With no signal applied to terminal $t2$, that is, to the base of transistor T2, the transistor T2 is biased into "saturation" by the resistor-potentiometer combination R4 and P2. The voltage on $t1$ is adjusted to the same potential as $t2$, when there is no input signal on $t2$ and this voltage on $t1$ does not vary appreciably when an input signal is applied to $t2$.

When the ambient temperature is at 25° C. and increases to 75° C., the characteristics of transistor T2 change such that the potential on terminal $t2$ drops between 100 and 200 millivolts. The potential on $t1$ drops likewise and thus partially but to a considerable extent compensates for the change in temperature. Otherwise, the input signal required to switch the amplifier off would increase tremendously.

Even if the transistor T1 could be made to compensate perfectly to hold the positive and negative input terminals $t1$ and $t2$ at the same potential for temperature changes, the change in leakage and gain of the transistors T2, T3, and T4 would require an increase in input at higher temperatures.

The thermistor-resistor combination, composed of resistor R5, potentiometer P4, and thermistor TH, which thermistor is a device that is quite sensitive to temperature changes and has a rather high negative temperature coefficient, serves as additional compensation to hold the switching level of the amplifier constant over the permissible ambient temperature range. The combination is also easily adjusted.

Typical component values

T1, T2, T3—Tex. Inst. type 903, Silicon N-P-N
T4—Tex. Inst. type 953, Silicon N-P-N
Z1—Tex. Inst. type 604C, Silicon diode
D1—Westinghouse type WP5052D, silicon diode
TH—Carboloy type R171, thermistor
C1—0.5 mfd.
P1, P2, P4—250K ohms 2 w. potentiometer.
P3—To suit application.
CR—Westinghouse type Z relay.
R1—68 ohm, ½ w.
R2—27 ohm, ½ w.
R3, R4, R5—39 ohm, ½ w.
R7—100 ohm, ½ w.
R6—15 ohm, 1 w.
R8
R9

The values above given are merely typical values for particular circuit arrangements reduced to practice. Where the circuit requirements are different the component values will be different.

For the typical values shown and for P4 set between 10% and 100% of its maximum resistance value, P4 will have very little affect on the combination at 75° C., where TH will be about 8K ohms. If the switching point is noted at 75° C., the same switching point may be obtained at 25° C. ambient temperature by adjusting P4 because at the ambient temperature P4 greatly determines the effective resistance of the resistor-thermistor combination.

Since the input current required to switch the amplifier does not change appreciably with temperature change, the input switching level of the amplifier can be adjusted by setting P3 to give the proper potential drop. Thus, the amplifier may be easily and quickly adjusted for any switching level even in service.

If the load current in the load M is below the danger value a voltage less than 700 millivolts appears between the terminal t2 and the emitter of transistor T2 and there is thus no effective signal on the transistor T2. Since it is biased into saturation under this condition, the transistor starts to conduct. This results in a slight reduction of the voltage at the circuit junction J1 and is operative to shunt part of the current through resistors R5 and P4 and thermistor TH away from the base circuit of the transistor T3 resulting in the transistor T3 becoming less conductive. When the transistor T3 comes out of its saturation condition, the potential of the circuit junction J2 begins to rise and increase in value. When the potential of junction J2 is sufficient to break down the Zener diode Z1 in its reverse direction, in other words is greater than the predetermined reverse direction breakdown voltage of Z1, current begins to flow in the base circuit of the transistor T4 causing this transistor to become conductive. The voltage of junction J3 now begins to decrease to further reduce the base current of transistor T3 due to the action of the feedback resistor R7 passing less current in a direction from the junction J3 to the junction J1. This results in a cascading action until the transistor T4 is driven into saturation and the transistor T3 is driven into its cutoff condition, and the result is that the current through the actuating coil of relay CR will be a maximum. This described cascading action takes place very rapidly and in the order of a few microseconds. The relay thus pulls in rapidly and remains pulled in to keep contacts 4 closed until such time as an excessive current flows through the load M requiring that the amplifier effect the interruption of the load circuit to protect it against overcurrent.

When an overcurrent occurs, a signal of such character appears on terminal t2 that the preamplifier silicon transistor T2 will be in a non-conducting state and as a result current will flow through the resistor R5, potentiometer P4 and thermistor TH, and the base-emitter circuit of the silicon transistor T3 causing this transistor to conduct.

Circuit junction J2 is now at a low voltage potential and is operative to keep the output transistor T4 in its cutoff condition and its output load current at a minimum value. The Zener diode Z1 connected in the base circuit of the transistor T4 is operative to maintain the transistor T4 in this cutoff condition despite the substantial saturation voltage of the silicon transistor T3 which is conducting. Since the transistor T4 is in its cutoff condition, the voltage of the circuit junction J3 will be at a relatively high positive value, which voltage value is fed back through the resistor R7 to the base circuit of the transistor T3 further driving the latter transistor T3 into saturation to stabilize the operation. Since the transistor T4 is not conducting the relay CR is deenergized and in consequence, contacts 4 are opened and the load circuit for the motor M, or any other type load that might be in the load circuit, is interrupted. This operation just discussed occurs very rapidly in the order of a few microseconds. The relay CR thus drops out very rapidly to protect the main load circuit against overcurrent.

Figure 2:
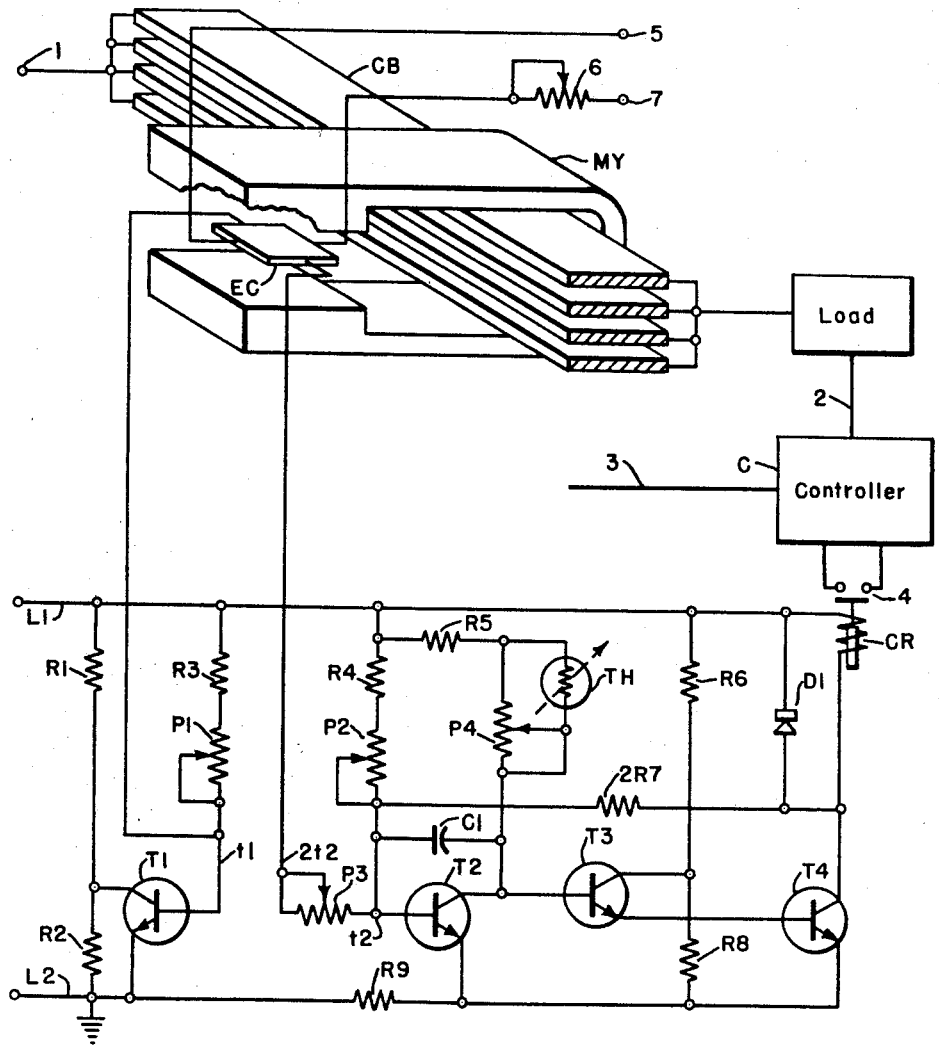
Fig. 2 is a diagrammatic showing of control circuitry similar to that shown in Fig. 1 but where the control signal is obtained from a Hall generator.

Fig. 2 shows how a Hall generator may be used instead of a shunt. In this showing the load circuit includes the heavy conductor bars CB in lieu of the shunt 3. These conductor bars produce a magnetic field that varies with the magnitude of the current flowing in the bars. A U-shaped magnetic yoke MY is disposed about the bars and thus aids in concentrating the magnetic flux across the ends, or legs, of the U to thus cause the flux to pass through the flat elongated rectangular conductor EC perpendicular to its surfaces. Terminals 5 and 7 are supplied with a suitable adjustable but constant voltage direct current supply. The potentiometer 6 may be adjusted to cause the desired control or reference current value to flow from edge to edge through the conductor. Under these conditions an output potential appears at the ends of the conductor EC that is a function of the control current flowing longitudinally of the conductor EC and the flux perpendicular to conductor EC.

This output potential from the ends of EC is supplied to terminals t1 and 2t2, or through the potentiometer P3 to t2. The amplifier circuit shown in Fig. 2 is very much the same as the amplifier shown in Fig. 1, except that a Zener diode is not used and resistors R8 and R9 are connected as shown.

In the circuit shown in Fig. 2 when normal current flows in the conductor bars CB a signal to saturate transistor T2 appears on terminal t2. Transistor T2 conducts, transistor T3 is off, and transistor T4 conducts.

When an overcurrent occurs in conductor bars CB transistor T2 becomes non-conducting, transistor T3 conducting, and transistor T4 non-conducting. This all takes place very rapidly upon occurrence of an overcurrent in conductor bars CB.

The capacitor C1, shown in both Figs. 1 and 2, is used to suppress possible oscillations caused by stray pickup effects and the like. The capacitor C1 does not materially affect the switching time of the amplifier. The diode D1 provides a low impedance discharge path for the actuating coil of relay CR to prevent the inductive voltage surge from the actuating coil of relay CR from damaging the transistor T4. Variations in line voltage will change the switching levels of these amplifiers. Hence, a well regulated supply is required on leads L1 and L2.

Figure 3:
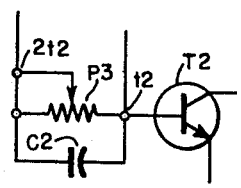
Figs. 3, 4 and 5 show some modified detail circuitry.
Figure 4:
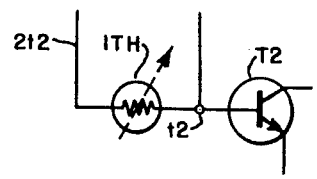
Figure 5:
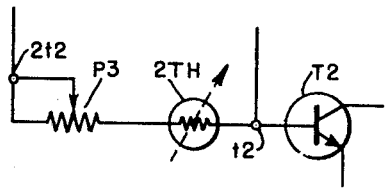

By placing the proper value of capacitance, by means of a suitable capacitor, across the potentiometer P3, as shown in Fig. 3, the amplifier can be made to switch at a definite rate of increase of the input signal. Also, a suitable thermistor, as shown in Fig. 4, used in place of potentiometer P3, or as an alternate, connected in series with P3, as shown in Fig. 5, will give an inverse tripping time characteristic, that is a short time for high overcurrent and a relatively long time for normal, or moderate, overcurrents in the load.

While but two circuit arrangements have been shown in disclosing this invention it should be understood that the disclosure has been made only by way of example and that changes may be made without departing from the scope and the spirit of the present invention.

We claim as our invention:

1. In apparatus for protecting a load circuit against improper loading, in combination, a bistable amplifier having a plurality of stages including an input stage and an output stage, a pair of direct current energized terminals, a first, or temperature compensating, transistor, having a base, a collector, and an emitter, a transistor biasing circuit for interconnecting the collector, the base, and emitter with said terminals, a first adjustable resistance means for interconnecting the base with said terminals, said input stage including a second transistor having a base, a collector, and an emitter, a second adjustable resistance means for interconnecting the base of the second transistor with said terminals, said second adjustable resistance means having the same characteristics as the first adjustable resistance means, whereby the voltage at the bases of the first and second transistors is maintained at substantially the same value with changes in ambient temperature so that a very small voltage difference between the bases suffices to actuate the input stage of the amplifier, circuit means responsive to an operating characteristic of said load circuit for supplying a signal voltage between the base of the first transistor and the base of the second transistor, and means responsive to the output stage of the amplifier for effecting the stopping of the operation of the load circuit.

2. In apparatus for protecting a load circuit against improper loading, in combination, a bistable amplifier having a plurality of stages including an input stage and an output stage, a pair of direct current energized terminals comprising a positive terminal and a negative terminal, a first, or temperature compensating, transistor, having a base, a collector, and an emitter, a transistor biasing circuit for interconnecting the collector, the base, and emitter with said terminals, a first adjustable resistance means for interconnecting the base with said positive terminal, said input stage including a second transistor having a base, a collector, and an emitter, a second adjustable resistance means for interconnecting the base of the second transistor with said positive terminal, said second adjustable resistance means having the same characteristics as the first adjustable resistance means, whereby the voltage at the bases of the first and second transistors is maintained at substantially the same value with changes in ambient temperature so that a very small voltage difference between the bases suffices to actuate the input stage of the amplifier, circuit means responsive to an operating characteristic of said load circuit for supplying a signal voltage between the base of the first transistor and the base of the second transistor, and means responsive to the output stage of the amplifier for effecting the stopping of the operation of the load circuit.

3. In apparatus for protecting a load circuit against improper loading, in combination, a bistable amplifier having a plurality of stages including an input stage and an output stage, a pair of direct current energized terminals, a first, or temperature compensating, transistor, having a base, a collector, and an emitter, a transistor biasing circuit for interconnecting the collector, the base, and emitter with said terminals, a first adjustable resistance means for interconnecting the base with said terminals, said input stage including a second transistor having a base, a collector, and an emitter, a second adjustable resistance means for interconnecting the base of the second transistor with said terminals, said second adjustable resistance means having the same characteristics as the first adjustable resistance means, whereby the voltage at the bases of the first and second transistors is maintained at substantially the same value with changes in ambient temperature so that a very small voltage difference between the bases suffices to actuate the input stage of the amplifier, a third adjustable resistance means including a temperature sensitive element having a negative temperature coefficient, interconnected with the collector, the base, and emitter of the second transistor and said terminals to thus compensate for changes in gain and leakage of the amplifier with changes of temperature, circuit means responsive to an operating characteristic of said load circuit for supplying a signal voltage between the base of the first transistor and the base of the second transistor, and means responsive to the output stage of the amplifier for effecting the stopping of the operation of the load circuit.

4. In apparatus for protecting a load circuit against improper loading, in combination, a bistable amplifier having a plurality of stages including an input stage and an output stage, a pair of direct current energized terminals, a first, or temperature compensating, transistor, having a base, a collector, and an emitter, a transistor biasing circuit for interconnecting the collector, the base, and emitter with said terminals, a first adjustable resistance means for interconnecting the base with said terminals, said input stage including a second transistor having a base, a collector, and an emitter, a second adjustable resistance means for interconnecting the base of the second transistor with said terminals, said second adjustable resistance means having the same characteristics as the first adjustable resistance means, whereby the voltage at the bases of the first and second transistors is maintained at substantially the same value with changes in ambient temperature so that a very small voltage difference between the bases suffices to actuate the input stage of the amplifier, adjustable impedance means interconnected with the base of the second transistor for adjusting the operating level of the second transistor, circuit means responsive to an operating characteristic of said load circuit for supplying a signal voltage between the base of the first transistor and, through the adjustable impedance means, the base of the second transistor, and means responsive to the output stage of the amplifier for effecting the stopping of the operation of the load circuit.

5. In apparatus for protecting a load circuit against improper loading, in combination, a bistable amplifier having a plurality of stages including an input stage and an output stage, a pair of direct current energized terminals comprising a positive terminal and a negative terminal, a first, or temperature compensating, transistor, having a base, a collector, and an emitter, a transistor biasing circuit for interconnecting the collector, the base, and emitter with said terminals, a first adjustable resistance means for interconnecting the base with said positive terminal, said input stage including a second transistor having a base, a collector, and an emitter, a second adjustable resistance means for interconnecting the base of the second transistor with said positive terminal, said second adjustable resistance means having the same characteristics as the first adjustable resistance means, whereby the voltage at the bases of the first and second transistors is maintained at substantially the same value with changes in ambient temperature so that a very small voltage difference between the bases suffices to actuate the input stage of the amplifier, a third adjustable resistance means including a temperature sensitive element having a negative temperature coefficient, interconnected with the collector, the base, and emitter of the second transistor and said terminals to thus compensate for changes in gain and leakage of the amplifier with changes of temperature, circuit means responsive to an operating characteristic of said load circuit for supplying a signal voltage between the base of the first transistor and the base of the second transistor, and means responsive to the output stage of the amplifier for effecting the stopping of the operation of the load circuit.

6. In apparatus for protecting a load circuit against improper loading, in combination, a bistable amplifier having a plurality of stages including an input stage and an output stage, a pair of direct current energized terminals comprising a positive terminal and a negative terminal, a first, or temperature compensating, transistor, having a base, a collector, and an emitter, a transistor biasing circuit for interconnecting the collector, the base, and emitter with said terminals, a first adjustable resistance means for interconnecting the base with said positive terminal, said input stage including a second transistor having a base, a collector, and an emitter, a second adjustable resistance means for interconnecting the base of the second transistor with said positive terminal, said second adjustable resistance means having the same characteristics as the first adjustable resistance means, whereby the voltage at the bases of the first and second transistors is maintained at substantially the same value with changes in ambient temperature so that a very small voltage difference between the bases suffices to actuate the input stage of the amplifier, adjustable impedance means interconnected with the base of the second transistor for adjusting the operating level of the second transistor, circuit means responsive to an operating characteristic of said load circuit for supplying a signal voltage between the base of the first transistor and, through the adjustable impedance means, the base of the second transistor, and means responsive to the output stage of the amplifier for effecting the stopping of the operation of the load circuit.

7. In apparatus for protecting a load circuit against improper loading, in combination, a bistable amplifier having a plurality of stages including an input stage and an output stage, a pair of direct current energized terminals, a first, or temperature compensating, transistor, having a base, a collector, and an emitter, a transistor biasing circuit for interconnecting the collector, the base, and emitter with said terminals, a first adjustable resistance means for interconnecting the base with said terminals, said input stage including a second transistor having a base, a collector, and an emitter, a second adjustable resistance means for interconnecting the base of the second transistor with said terminals, said second adjustable resistance means having the same characteristics as the first adjustable resistance means, whereby the voltage at the bases of the first and second transistors is maintained at substantially the same value with changes in ambient temperature so that a very small voltage difference between the bases suffices to actuate the input stage of the amplifier, a third adjustable resistance means including a temperature sensitive element having a negative temperature coefficient, interconnected with the collector, the base, and emitter of the second transistor and said terminals to thus compensate for changes in gain and leakage of the amplifier with changes of temperature, adjustable impedance means interconnected with the base of the second transistor for adjusting the operating level of the second transistor, circuit means responsive to an operating characteristic of said load circuit for supplying a signal voltage between the base of the first transistor and, through the adjustable impedance means, the base of the second transistor, and means responsive to the output stage of the amplifier for effecting the stopping of the operation of the load circuit.

8. In apparatus for protecting a load circuit against improper loading, in combination, a bistable amplifier having a plurality of stages including an input stage and an output stage, a pair of direct current energized terminals comprising a positive terminal and a negative terminal, a first, or temperature compensating, transistor, having a base, a collector, and an emitter, a transistor biasing circuit for interconnecting the collector, the base, and emitter with said terminals, a first adjustable resistance means for interconnecting the base with said positive terminal, said input stage including a second transistor having a base, a collector, and an emitter, a second adjustable resistance means for interconnecting the base of the second transistor with said positive terminal, said second adjustable resistance means having the same characteristics as the first adjustable resistance means, whereby the voltage at the bases of the first and second transistors is maintained at substantially the same value with changes in ambient temperature so that a very small voltage difference between the bases suffices to actuate the input stage of the amplifier, a third adjustable resistance means including a temperature sensitive element having a negative temperature coefficient, interconnected with the collector, the base, and emitter of the second transistor and said terminals to thus compensate for changes in gain and leakage of the amplifier with changes of temperature, adjustable impedance means interconnected with the base of the second transistor for adjusting the operating level of the second transistor, circuit means responsive to an operating characteristic of said load circuit for supplying a signal voltage between the base of the first transistor and, through the adjustable impedance means, the base of the second transistor, and means responsive to the output stage of the amplifier for effecting the stopping of the operation of the load circuit.

References Cited in the file of this patent

UNITED STATES PATENTS

| | | |
|---|---|---|
| 2,816,262 | Elliott | Dec. 10, 1957 |
| 2,832,900 | Ford | Apr. 29, 1958 |
| 2,850,650 | Mecham | Sept. 2, 1958 |
| 2,850,694 | Hamilton | Sept. 2, 1958 |
| 2,850,695 | Bishop | Sept. 2, 1958 |